United States Patent
Meyer et al.

(10) Patent No.: US 6,984,005 B2
(45) Date of Patent: Jan. 10, 2006

(54) VEHICLE BRAKING METHOD AND SYSTEM

(75) Inventors: Benno Meyer, Bad Nenndorf (DE); Marcel Schlottmann, Hannover (DE); Immanuel Henken, Lauenau (DE); Thomas Lenz, Lehrte (DE); Tobias Munko, Hannover (DE); Gerhard Ruhnau, Neustadt (DE)

(73) Assignee: WABCO GmbH & Co. oHG, Hannover (DE)

(*) Notice: Subject to any disclaimer, the term of this patent is extended or adjusted under 35 U.S.C. 154(b) by 210 days.

(21) Appl. No.: 10/619,267

(22) Filed: Jul. 14, 2003

(65) Prior Publication Data

US 2004/0012252 A1 Jan. 22, 2004

(30) Foreign Application Priority Data

Jul. 19, 2002 (DE) .................................. 102 32 792

(51) Int. Cl.
B60T 8/62 (2006.01)

(52) U.S. Cl. ............... 303/186; 303/9.66; 303/113.5
(58) Field of Classification Search ............. 303/9.66, 303/113.5, 155, 167, 169, 171, 173, 176, 303/183, 186; 701/91, 93, 96; 180/169, 170–179
See application file for complete search history.

(56) References Cited

U.S. PATENT DOCUMENTS

| | | | | |
|---|---|---|---|---|
| 5,400,864 A | * | 3/1995 | Winner et al. ............. 180/169 |
| 6,254,202 B1 | * | 7/2001 | Kawamoto ............. 303/122.09 |
| 6,285,944 B1 | * | 9/2001 | Tange et al. ............. 701/96 |
| 6,345,869 B1 | * | 2/2002 | Matsuo et al. ............. 303/116.1 |
| 6,374,171 B2 | * | 4/2002 | Weiberle et al. ............. 701/71 |
| 6,582,034 B2 | * | 6/2003 | Hara et al. ............. 303/157 |

FOREIGN PATENT DOCUMENTS

| | | |
|---|---|---|
| DE | 42 00 694 A1 | 7/1993 |
| DE | 195 03 455 C1 | 3/1996 |
| DE | 196 47 997 A1 | 5/1998 |
| DE | 197 51 891 A1 | 5/1999 |

* cited by examiner

*Primary Examiner*—Chris Schwartz
(74) *Attorney, Agent, or Firm*—Kramer Levin Naftalis & Frankel LLP

(57) ABSTRACT

An improved braking method and system for a vehicle equipped with an anti-lock brake system (ABS), a traction control or anti-slip regulation system (ASR) and one or more additional systems capable of effecting automatic braking of the vehicle independently of driver control, e.g., an adaptive cruise control system (ACC) or a rollover stability control system (RSC). Automatic braking takes place by admission of brake pressure to the drive axle. To detect a simultaneous braking demand of the driver, the wheel speeds of the non-driven axle or axles are compared with the wheel speeds of the drive axle or axles. If the wheel speeds of the non-driven axle(s) are less than the wheel speeds of the drive axle(s), or less than a vehicle reference speed, the brake pressure injected in response to driver demand is also fed to the brake cylinders of the wheels of the drive axle(s).

28 Claims, 1 Drawing Sheet

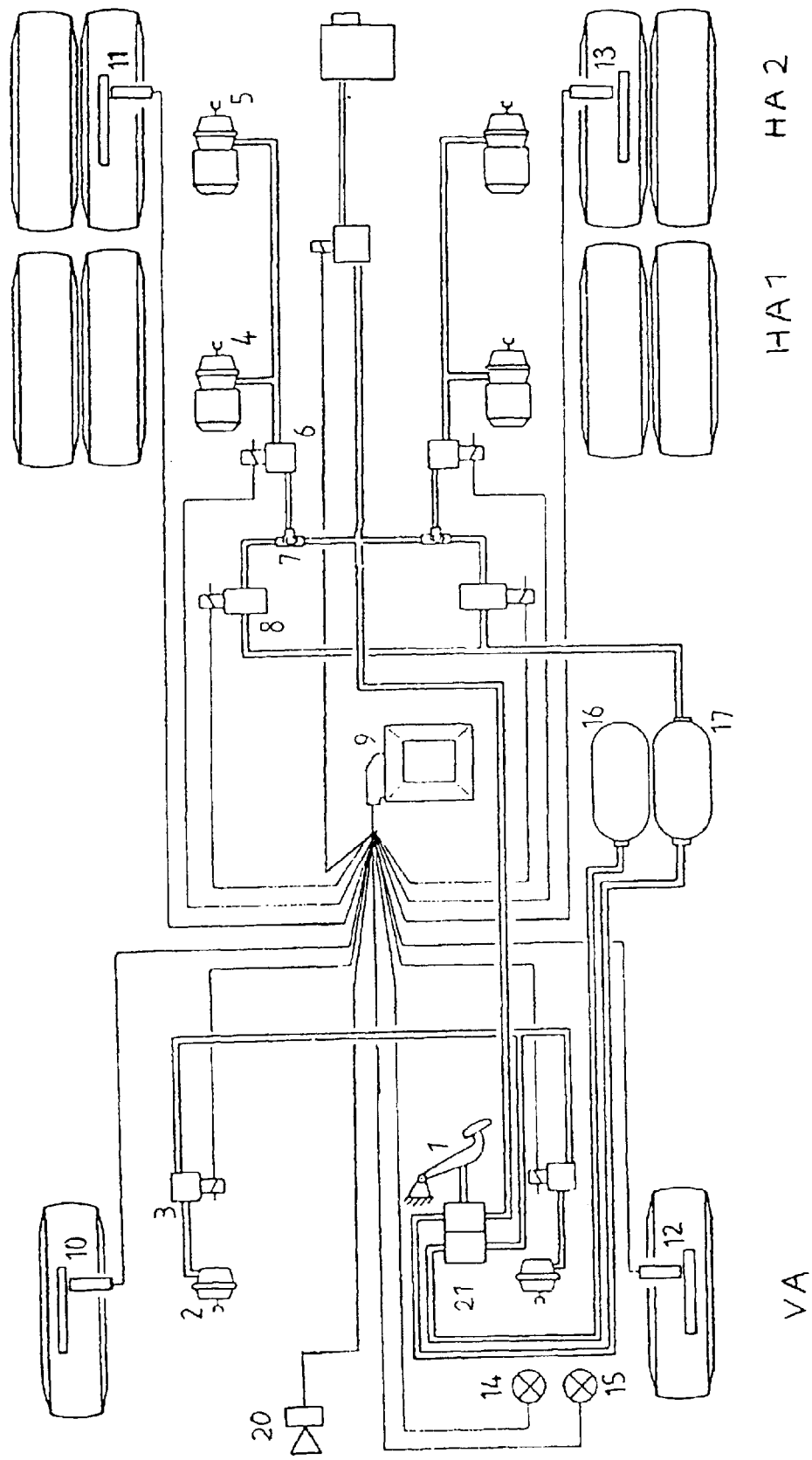

VEHICLE BRAKING METHOD AND SYSTEM

BACKGROUND OF THE INVENTION

The present invention is directed generally to an improved braking method and system for vehicles equipped with anti-lock brake systems and traction control or anti-slip regulation systems and additional systems which provide automatic braking capabilities.

It is known to equip vehicles, especially commercial vehicles, with anti-lock brake systems (ABS) which function to prevent locking of individual wheels during vehicle braking and, thus, to shorten braking distance without losing lateral traction. In most cases, ABSs also include traction control or anti-slip regulation systems (ASR), which function to prevent spinning of the drive wheels as the vehicle starts to move by braking the spinning wheels or by throttling engine power. Thus, individual wheels of the drive axle or axles are automatically braked as needed by the ASR, without requiring the vehicle driver to actuate the brake pedal.

Additional vehicle systems which have automatic braking capabilities that function independently of driver control include adaptive cruise control systems (ACC) and rollover stability control systems (RSC).

In an ACC, the distance from the vehicle in front is automatically adjusted. If the distance from a vehicle driving in front becomes shorter than a pre-set safe distance (e.g., because the vehicle in front has slowed down), the following vehicle is automatically slowed down, without any action by the driver, either by a reduction of engine power or by automatic actuation of the brakes. DE 4200694 A1 generally discloses such an ACC.

In an RSC, automatic braking of individual wheels is initiated if the vehicle electronic control unit (ECU) senses that vehicle rollover is imminent, for example, because the vehicle is traveling too fast on a curve. If it is determined that the rollover danger is particularly great, all wheels are braked in order to decelerate the vehicle as quickly as possible. DE 19751891 A1 generally discloses such an RSC.

In vehicle systems of the types discussed above with automatic braking capabilities controlled by a vehicle ECU, the ACC and RSC permit additional braking of the vehicle by the vehicle driver via actuation of the brake pedal. As an example, this may occur in the case of an ACC if the distance to the vehicle in front is closing particularly rapidly (as in a traffic jam, for example), and the driver wishes to brake the vehicle particularly heavily as a precaution or for additional deceleration. This is particularly desirable if automatic braking by the ACC acts only on the wheels of the drive axle(s), meaning that full deceleration of the vehicle cannot be achieved ("low-cost system"). Similarly, in vehicles with RSCs, the capability of the vehicle driver to apply additional braking is desirable, especially in the case of a basic RSC in which automatic braking takes place only by the wheels of the drive axle(s).

The prior art noted above does not address additional brake actuation by the driver as described above. For example, DE 4200694 A1 (ACC) discloses that, if the driver intervenes in the driving sequence, adaptive cruise control is interrupted. This means that automatic braking is disabled and normal braking by the driver takes place. After a pre-settable time interval, adaptive cruise control is automatically reactivated. DE 19751891 A1 (RSC), also noted above, does not address the case of additional brake actuation by the driver during RSC control.

In the basic systems for ACC and RSC discussed above, only the wheels of the drive axle(s) are automatically braked in control mode. This is accomplished by the opening of one or more ASR valves, by which the driver's brake valve is bypassed, thus allowing brake fluid to flow directly from a supply tank into the brake cylinders of the drive axle(s). This brake pressure is reduced to a suitable level, which is either constant or variable, by brief opening and closing of the ABS valves disposed upstream.

If the driver additionally actuates the brake valve, the vehicle is decelerated more strongly since the front wheels are also being braked. However, if the brake pressure being injected in response to driver demand is greater than the pressure being injected automatically by the ACC or RSC, this brake pressure cannot be relayed at the desired level to the brake cylinders, since the full supply pressure is present at the closed ABS valves. Thus, further transmission of the brake pressure injected in response to driver demand is prevented, and the driver's demand for additional braking is not completely met.

It is therefore desirable to allow for additional brake actuation by the driver and to signal such actuation to the vehicle ECU to enable it to terminate automatic braking of the wheels of the drive axle(s) by closing the ASR valves and opening the ABS valves, so that the service brake pressure injected in response to driver demand can act normally on all wheels of the vehicle, including the wheels of the drive axle(s).

For this purpose, it is possible to mount a pressure sensor or a displacement sensor on the brake pedal to sense a pressure level output by the brake pedal or a travel of the pedal and to signal this information to the ECU. In addition, a further pressure sensor would be required to check whether the brake pressure exerted as a result of the driver's actuation of the brake pedal is higher than the brake pressure at the drive axle(s). Such additional sensors, including associated evaluation software, however, mean undesired higher costs.

Accordingly, it is desired to provide a method and system that provide the capability to ascertain whether braking initiated by the vehicle driver is being applied at a level greater than that resulting from automatic vehicle braking, without the need for additional hardware such as, in particular, additional sensors, and that permit the braking demands initiated by the vehicle driver to be completely met.

SUMMARY OF THE INVENTION

Generally speaking, in accordance with the present invention, for a vehicle equipped with a conventional ECU controlled ABS/ASR and one or more additional systems that effect automatic vehicle braking when appropriate independently of the driver, such as, for example, an ACC or an RSC, an improved method and system are provided to permit braking demands initiated by the vehicle driver to be applied irrespective of automatic braking activity.

According to one embodiment of the present invention, wheel speeds for the non-driven axle(s) and drive axle(s) of the vehicle are determined and compared. In response to driver braking demand, brake pressure is provided to the brake cylinders of the drive axle(s) irrespective of any automatic braking by the ACC, RSC or other vehicle system providing automatic braking capabilities if the wheel speed of at least one wheel of the non-driven axle(s) is less than the wheel speeds of the drive axle(s) by at least a pre-defined amount.

In an alternative embodiment, the comparison is made between the wheel speeds of the non-driven axle(s) and a vehicle reference speed formed by the ABS. If the wheel speeds of the non-driven axle(s) are less than the vehicle reference speed by at least the pre-defined amount, the brake pressure injected as a result of action by the vehicle driver is also fed to the brake cylinders of the drive axle(s) irrespective of any automatic braking by the ACC, RSC or other such vehicle system.

In another embodiment of the present invention, a combined comparison of the wheel speeds of the non-driven axle(s) can be made both with the wheel speeds of the drive axle(s) and with the vehicle reference speed.

In ACC mode, when the vehicle is traveling a straight course, the speeds of the front wheels are compared with the ABS reference speed. In RSC mode, during travel on a curve, the slip of the wheels at the inside of the curve is checked by comparison with a vehicle reference speed corrected for curve radius to correspond to the inside of the curve.

If a pre-defined slip differential is exceeded, the injection of brake pressure via ASR valves is terminated, and the ABS valves are forced open so that higher brake pressure demanded by the driver can directly reach the brake cylinders of the drive axle(s).

If, because of a demand by the driver for particularly high pressure, an ABS control action begins at the front wheels of the vehicle, such control action is detected by the ECU, and automatic injection of brake pressure to the brake cylinders of the drive axle(s) is terminated by closing the ASR valves.

In another embodiment of the present invention, a check can be performed, after the ASR valves have been closed, to determine whether greater deceleration has actually been demanded by the driver. This is accomplished by checking the vehicle deceleration then established which has to be increased appropriately.

Brake actuation according to the present invention requires only software/program enhancement of the ECU. Additional hardware, such as additional sensors (e.g., pressure and displacement sensors), is not necessary.

Accordingly, it is an object of the present invention to provide an improved braking method and system for a vehicle equipped with ABS/ASR and one or more additional vehicle systems which provide automatic braking capabilities that function independently of driver control, such as, for example, ACC and RSC, whereby a braking demand of the driver in addition to automatic braking can be detected and completely met.

It is another object of the present invention to provide an improved braking method and system for a vehicle equipped with ABS/ASR and one or more additional vehicle systems which provide automatic braking capabilities that are cost effective to implement.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicted in the claims.

BRIEF DESCRIPTION OF THE DRAWINGS

For a fuller understanding of the invention, reference is had to the following description taken in connection with the accompanying drawing in which:

FIG. 1 a schematic diagram of the pneumatic and electrical parts of a brake system of a conventional commercial vehicle equipped with one front axle or steering axle (VA) and two rear axles or drive axles (HA1, HA2).

DETAILED DESCRIPTION OF THE PREFERRED EMBODIMENTS

Referring now to FIG. 1, there is shown in simplified schematic form the brake system of a conventional commercial vehicle, generally indicated as 22, having three axles VA, HA1 and HA2, and six wheels. The wheels of the front axle or steering axle VA are equipped with wheel-speed sensors 10, 12, and the wheels of the second rear axle HA2 are equipped with wheel-speed sensors 11, 13. The output signals of the wheel-speed sensors 10, 11, 12 and 13 are delivered to a vehicle ECU 9 which controls a vehicle ABS and ASR in addition to an ACC and/or an RSC.

For braking of the front axle VA, compressed air from a supply tank 16 is passed via a dual brake valve 21 and ABS valves 3 to brake cylinders 2, in order to brake the front vehicle wheels when the vehicle driver depresses a brake pedal 1.

While the brake system of the vehicle 22 depicted in FIG. 1 is of the pneumatic type, it should be understood that the present invention has application in vehicle brake systems which operate according to other principles. Also, because the brake system of the vehicle 22 depicted in FIG. 1 has generally symmetrical construction, for simplicity, only the valves and components of the right side of the vehicle are labeled with reference numbers.

Service braking of the rear axle(s) HA1, HA2 takes place from a second compressed air supply tank 17, wherein compressed air from the left port of the supply tank 17 is also passed first via the dual brake valve 21 and then is delivered via two shuttle valves 7, which allow whichever input pressure is higher at the time to pass, and two ABS valves 6 to the brake cylinders 4, 5 of the rear axle(s) HA1, HA2.

The right port of the supply tank 17 is connected via the ASR valves 8, the shuttle valves 7 and the ABS valves 6 to the brake cylinders 4, 5 of the rear axle(s) HA1, HA2.

It should be understood that, depending on the individual configuration of pressure lines in the vehicle 22, one common ASR valve can be substituted for the two ASR valves 8.

The right port of the supply tank 17 is used to execute the ASR function of the vehicle 22. The ASR valves 8 cooperate in known manner with the ABS valves 6 disposed downstream to apply unilateral braking to any drive wheel that spins when the vehicle 22 starts to move. For this purpose, the ASR valves are actuated in ASR mode by the ECU 9 in combination with the associated right or left ABS valve 6 as soon as the ECU detects, via the wheel-speed sensors 11, 13, that a drive wheel is spinning. Thereby, any spinning drive wheel is braked in known manner and an additional torque is applied to the opposite wheel on the side where the roadway is in better condition. Simultaneous actuation of the appropriate ABS valves ensures that the full supply pressure of tank 17 is not injected, since this could lead to undesired lockup of the spinning wheel.

Indicator lights 14, 15 are provided for monitoring the ABS and ASR functions.

In a vehicle equipped with an ACC, a distance sensor 20 for sampling the distance to a vehicle driving in front of vehicle 22 is also connected to the ECU 9. The connection can be made directly or via a data bus provided in the vehicle 22. The sensor 20 can be of any suitable conventional type which operates on known measurement principles, such as, for example, a radar, infrared or ultrasonic sensor.

In a vehicle equipped with an RSC, a potential rollover condition of the vehicle 22 can be detected in known manner by the ECU 9 from the wheel speed information provided by the wheel-speed sensors 10, 11, 12 and 13, and possibly also from the signals of additional sensors, such as, for example, lateral acceleration sensors or yaw rate sensors. To prevent rollover, the ASR valves 8 as well as the ABS valves 6 are actuated as appropriate to deliver pressurized fluid from the supply tank 17 (brake pressure) to the brake cylinders 4, 5 of the wheels of the drive axles HA1, HA2. The purpose is to rapidly decelerate the vehicle 22.

If the vehicle driver actuates the brake pedal during ACC or RSC controlled (automatic) braking of the drive axles, it is desirable to allow for the additional braking demand of the driver and thereby to permit heavier braking of the drive axle(s) or of the entire vehicle. This situation arises when the brake pressure injected in response to the vehicle driver's depression of the brake pedal 1 exceeds the brake pressure injected automatically by the ACC or RSC at the rear axle(s) HA1 and HA2 of the vehicle 22. On the other hand, if the brake pressure injected in response to action by the driver does not reach the values of the automatically injected brake pressure, it no longer need be taken into consideration.

In order to achieve, in the ECU 9, a reaction to the brake pressure additionally injected as a result of action by the vehicle driver, however, such brake actuation by the driver must first be detected and signaled to the ECU. This is accomplished according to the present invention without the use of additional sensors.

According to one (first) embodiment of the present invention, a comparison is made of the wheel speeds of the non-driven axle(s) VA with the wheel speeds of the drive axle(s) HA1, HA2. In an alternative (second) embodiment, a comparison is made of the wheel speeds of the non-driven axle(s) VA with a vehicle reference speed (vref) formed by the ABS.

If, in the first embodiment, the wheel speeds of the non-driven axle(s) VA are less than the wheel speeds of the drive axle(s) HA1, HA2 by a pre-defined amount or percentage, the brake pressure injected as a result of braking action by the vehicle driver is also fed to the brake cylinders 4, 5 of the drive axle(s) HA1, HA2 irrespective of any automatic braking. It is desirable to pre-specify an amount or a percentage difference in wheel speeds to ensure that the braking function does not respond erroneously.

If, in the second embodiment, the wheel speeds of the non-driven axle(s) VA are slower than the vehicle reference speed (vref) by a pre-defined value, the brake pressure injected as a result of action by the vehicle driver is also fed to the brake cylinders 4, 5 of the drive axle(s) HA1, HA2 irrespective of any automatic braking.

In both embodiments, therefore, a check is performed to determine whether, as a result of braking by the driver, the wheels of the non-driven axle(s) VA are running more slowly, or in other words have greater slip, than the wheels of the drive axle(s) HA1, HA2. In general, this is the case only if the brake pressure demanded by the driver exceeds the brake pressure injected by the RSC or ACC. According to the present invention, the higher brake pressure injected as a result of action by the vehicle driver can act on all wheels of the vehicle even if it exceeds the ACC or RSC pressure, thus leading to heavier braking of the vehicle.

In another embodiment of the present invention, a combined comparison of the wheel speeds of the non-driven axle(s) can be made both with the wheel speeds of the drive axle(s) and with the vehicle reference speed (vref) formed by the ABS. Such an additional comparison with the rear axle(s) can deliver a clearer result under certain circumstances. The slip differential that develops depends primarily on the deceleration produced at the wheels and on the coefficient of friction of the roadway at the time.

In ACC mode, when the vehicle 22 is traveling a straight course, the speeds of the front wheels are compared with the ABS reference speed (vref).

In RSC mode, or, in other words, during travel on a curve, the wheels at the inside of the curve generally experience greater slip during braking because the wheel load is reduced by centrifugal force. Therefore, the slip of these wheels is checked specifically by comparison with a vehicle reference speed corrected for curve radius to correspond to the inside of the curve. A comparison with a wheel on the outside of the curve can also be made.

If a pre-defined slip differential is exceeded, the injection of brake pressure via the ASR valves 8 in the manner described above is terminated (disabled), and the ABS valves 6 are forced open. As a result, the higher brake pressure demanded by the driver can directly reach the brake cylinders 4, 5 of the drive axle(s) HA1, HA2.

The same sequence takes place if, because of a demand by the driver for particularly high pressure, especially on a smooth roadway, an ABS control action begins at the front wheels of the vehicle 22. While it is beginning, this control action is detected by the ECU 9, and automatic injection of brake pressure to the brake cylinders 4, 5 of the rear axle(s) HA1, HA2 is terminated by closing the ASR valves 8.

In another embodiment of the present invention, a check can be performed, after ASR valves 8 have been turned off or closed in the manner described above, to determine whether greater deceleration has actually been demanded by the driver. This is accomplished by checking the vehicle deceleration then established which has to be increased appropriately.

It should be appreciated that brake actuation according to the present invention requires only software/program enhancement of the ECU 9. Additional hardware, such as additional sensors (e.g., pressure and displacement sensors), is not necessary.

Accordingly, in a vehicle equipped with conventional ABS/ASR and additional vehicle systems which have automatic braking capabilities such as ACC and RSC, for example, the present invention makes it possible to detect an additional braking demand of the driver, merely by an expansion of the programming or by additional software in the vehicle ECU, and to completely meet the driver's demand. Thus, in an emergency, the vehicle can be braked by means of the service brakes to achieve the maximum possible deceleration.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In a vehicle having at least one drive axle and at least one non-driven axle, said at least one drive axle and said at least one non-driven axle including wheels, said vehicle further having an anti-lock brake system, an anti-slip regulation system including at least one valve for controlling the delivery of brake pressure from a source of said pressure to at least one brake cylinder of said at least one drive axle, at least one further system constructed and arranged to automatically brake said vehicle by braking said at least one drive axle via said at least one valve of said anti-slip regulation system, and an electronic control unit for controlling said anti-lock brake system, said anti-slip regulation system and said at least one further system, a method for braking said vehicle comprising the steps of determining wheel speeds associated with said at least one non-driven axle and wheel speeds associated with said at least one drive axle, comparing said wheel speeds associated with said at least one non-driven axle with said wheel speeds associated with said at least one drive axle, and providing brake pressure in response to driver braking demand to said at least one brake cylinder of said at least one drive axle irrespective of any automatic braking by said at least one further system when at least one of said wheel speeds associated with said at least one non-driven axle is less than said wheel speeds associated with said at least one drive axle by at least a pre-defined value.

2. The method according to claim 1, wherein said at least one further system is an adaptive cruise control system.

3. The method according to claim 1, wherein said at least one further system is a rollover stability control system.

4. The method according to claim 1, wherein said step of comparing said wheel speeds associated with said at least one non-driven axle with said wheel speeds associated with said at least one drive axle further includes comparing said wheel speeds associated with said at least one non-driven axle with a vehicle reference speed calculated by said anti-lock brake system.

5. The method according to claim 1, further comprising the steps of ascertaining whether an anti-lock brake system control action is initiated at said wheels of said at least one non-driven axle as a result of driver braking demand, and, when said anti-lock brake system control action is detected, providing said brake pressure to said at least one brake cylinder of said at least one drive axle in response to said driver braking demand.

6. The method according to claim 1, wherein, when said vehicle is traveling a straight course, said step of comparing said wheel speeds associated with said at least one non-driven axle with said wheel speeds associated with said at least one drive axle includes comparing wheel speeds of said wheels of said at least one non-driven axle with at least one of (i) said wheel speeds associated with said at least one drive axle and (ii) a vehicle reference speed calculated by said anti-lock brake system.

7. The method according to claim 1, wherein, when said vehicle is traveling on a curve, said step of comparing said wheel speeds associated with said at least one non-driven axle with said wheel speeds associated with said at least one drive axle includes comparing wheel speeds of ones of said wheels that are disposed on the inside of the curve with a vehicle reference speed, said vehicle reference speed being based on the characteristics of the inside of the curve.

8. The method according to claim 1, wherein said step of providing brake pressure in response to driver braking demand to said brake cylinders of said at least one drive axle irrespective of any automatic braking by said at least one further system includes the step of closing said at least one valve of said anti-slip regulation system, and further comprising the step of checking whether vehicle deceleration associated with said driver braking demand is greater than a previous deceleration of said vehicle.

9. In a vehicle having at least one drive axle and at least one non-driven axle, said at least one drive axle and said at least one non-driven axle including wheels, said vehicle further having an anti-lock brake system, an anti-slip regulation system including at least one valve for controlling the delivery of brake pressure from a source of said pressure to at least one brake cylinder of said at least one drive axle, at least one further system constructed and arranged to automatically brake said vehicle by braking said at least one drive axle via said at least one valve of said anti-slip regulation system, and an electronic control unit for controlling said anti-lock brake system, said anti-slip regulation system and said at least one further system, a method for braking said vehicle comprising the steps of determining wheel speeds associated with said at least one non-driven axle, comparing said wheel speeds associated with said at least one non-driven axle with a vehicle reference speed calculated by said anti-lock brake system, and providing brake pressure in response to driver braking demand to said at least one brake cylinder of said at least one drive axle irrespective of any automatic braking by said at least one further system when at least one of said wheel speeds associated with said at least one non-driven axle is less than said vehicle reference speed by at least a pre-defined value.

10. The method according to claim 9, wherein said at least one further system is an adaptive cruise control system.

11. The method according to claim 9, wherein said at least one further system is a rollover stability control system.

12. The method according to claim 9, wherein said step of comparing said wheel speeds associated with said at least one non-driven axle with said vehicle reference speed calculated by said anti-lock brake system further includes determining wheel speeds associated with said at least one drive axle and comparing said wheel speeds associated with said at least one non-driven axle with said wheel speeds associated with said at least one drive axle.

13. The method according to claim 9, further comprising the steps of ascertaining whether an anti-lock brake system control action is initiated at said wheels of said at least one non-driven axle as a result of driver braking demand, and, when said anti-lock brake system control action is detected, providing said brake pressure to said at least one brake cylinder of said at least one drive axle in response to said driver braking demand.

14. The method according to claim 9, wherein, when said vehicle is traveling a straight course, said step of comparing said wheel speeds associated with said at least one non-driven axle with said vehicle reference speed calculated by said anti-lock brake system includes comparing wheel speeds of said wheels of said at least one non-driven axle with at least one of (i) said vehicle reference speed calculated by said anti-lock brake system and (ii) wheel speeds associated with said at least one drive axle.

15. The method according to claim 9, wherein, when said vehicle is traveling on a curve, said step of comparing said wheel speeds associated with said at least one non-driven axle with said vehicle reference speed includes comparing wheel speeds of ones of said wheels that are disposed on the inside of the curve with said vehicle reference speed, said vehicle reference speed being adjusted based on the characteristics of the inside of the curve.

16. The method according to claim 9, wherein said step of providing brake pressure in response to driver braking demand to said at least one brake cylinder of said at least one drive axle irrespective of any automatic braking by said at least one further system includes the step of closing said at least one valve of said anti-slip regulation system, and further comprising the step of checking whether vehicle deceleration associated with said driver braking demand is greater than a previous deceleration of said vehicle.

17. A vehicle braking system for a vehicle having at least one drive axle and at least one non-driven axle, said at least one drive axle and said at least one non-driven axle including wheels, said vehicle further having an anti-lock brake system, an anti-slip regulation system including at least one valve for controlling the delivery of brake pressure from a source of said pressure to at least one brake cylinder of said at least one drive axle, at least one further system constructed and arranged to automatically brake said vehicle by braking said at least one drive axle via said at least one valve of said anti-slip regulation system, and an electronic control unit for controlling said anti-lock brake system, said anti-slip regulation system and said at least one further system, the vehicle braking system comprising means for determining wheel speeds associated with said at least one non-driven axle and wheel speeds associated with said at least one drive axle, means for comparing said wheel speeds associated with said at least one non-driven axle with said wheel speeds associated with said at least one drive axle, and means for providing brake pressure in response to driver braking demand to said at least one brake cylinder of said at least one drive axle irrespective of any automatic braking by said at least one further system when at least one of said wheel speeds associated with said at least one non-driven axle is less than said wheel speeds associated with said at least one drive axle by at least a pre-defined value.

18. The system according to claim 17, wherein said at least one further system is an adaptive cruise control system.

19. The system according to claim 17, wherein said at least one further system is a rollover stability control system.

20. The system according to claim 17, further comprising means for comparing said wheel speeds associated with said at least one non-driven axle with a vehicle reference speed calculated by said anti-lock brake system.

21. The system according to claim 17, further comprising means for ascertaining whether an anti-lock brake system control action is initiated at said wheels of said at least one non-driven axle as a result of driver braking demand, and means for providing said brake pressure to said at least one brake cylinder of said at least one drive axle in response to said driver braking demand when said anti-lock brake system control action is detected.

22. The system according to claim 17, wherein said means for providing brake pressure in response to driver braking demand to said at least one brake cylinder of said at least one drive axle irrespective of any automatic braking by said at least one further system includes means for closing said at least one valve of said anti-slip regulation system, and further comprising means for checking whether vehicle deceleration associated with said driver braking demand is greater than a previous deceleration of said vehicle.

23. A vehicle braking system for a vehicle having at least one drive axle and at least one non-driven axle, said at least one drive axle and said at least one non-driven axle including wheels, said vehicle further having an anti-lock brake system, an anti-slip regulation system including at least one valve for controlling the delivery of brake pressure from a source of said pressure to at least one brake cylinder of said at least one drive axle, at least one further system constructed and arranged to automatically brake said vehicle by braking said at least one drive axle via said at least one valve of said anti-slip regulation system, and an electronic control unit for controlling said anti-lock brake system, said anti-slip regulation system and said at least one further system, said vehicle braking system comprising means for determining wheel speeds associated with said at least one non-driven axle, means for comparing said wheel speeds associated with said at least one non-driven axle with a vehicle reference speed calculated by said anti-lock brake system, and means for providing brake pressure in response to driver braking demand to said at least one brake cylinder of said at least one drive axle irrespective of any automatic braking by said at least one further system when at least one of said wheel speeds associated with said at least one non-driven axle is less than said vehicle reference speed by at least a pre-defined value.

24. The system according to claim 23, wherein said at least one further system is an adaptive cruise control system.

25. The system according to claim 23, wherein said at least one further system is a rollover stability control system.

26. The system according to claim 23, further comprising means for determining wheel speeds associated with said at least one drive axle, and means for comparing said wheel speeds associated with said at least one non-driven axle with said wheel speeds associated with said at least one drive axle.

27. The system according to claim 23, further comprising means for ascertaining whether an anti-lock brake system control action is initiated at said wheels of said at least one non-driven axle as a result of driver braking demand, and means for providing said brake pressure to said at least one brake cylinder of said at least one drive axle in response to said driver braking demand when said anti-lock brake system control action is detected.

28. The system according to claim 23, wherein said means for providing brake pressure in response to driver braking demand to said at least one brake cylinder of said at least one drive axle irrespective of any automatic braking by said at least one further system includes means for closing said at least one valve of said anti-slip regulation system, and further comprising means for checking whether vehicle deceleration associated with said driver braking demand is greater than a previous deceleration of said vehicle.

* * * * *